US006731484B2

(12) United States Patent
Pebles et al.

(10) Patent No.: US 6,731,484 B2
(45) Date of Patent: May 4, 2004

(54) INTEGRATED HIGH VOLTAGE TRANSIENT SURGE SUPPRESSION WITH AUTOMATIC TRANSFER SWITCH FOR ALTERNATE SOURCE OF ELECTRICITY

(75) Inventors: Marlis Jean Pebles, Spokane, WA (US); James Neil McDonald, Jr., Greenacres, WA (US)

(73) Assignee: Northern Technologies, Inc., Liberty Lake, WA (US)

( * ) Notice: Subject to any disclaimer, the term of this patent is extended or adjusted under 35 U.S.C. 154(b) by 91 days.

(21) Appl. No.: 10/035,459

(22) Filed: Dec. 26, 2001

(65) Prior Publication Data

US 2003/0117761 A1 Jun. 26, 2003

(51) Int. Cl.[7] .............................. H02H 3/24; H02H 3/20
(52) U.S. Cl. ........................ 361/90; 361/91.1; 361/118
(58) Field of Search ........................ 361/90, 91.1, 118

(56) References Cited

U.S. PATENT DOCUMENTS

| 4,405,867 | A | * | 9/1983 | Moakler et al. ............... 307/64 |
| 4,760,278 | A | * | 7/1988 | Thomson ..................... 307/64 |
| 5,416,416 | A | * | 5/1995 | Bisher ........................ 324/426 |
| 5,646,458 | A | * | 7/1997 | Bowyer et al. ................ 307/67 |
| 5,784,240 | A | * | 7/1998 | Przywozny ................... 361/85 |
| 5,811,960 | A | * | 9/1998 | Van Sickle et al. ............. 322/4 |
| 5,914,467 | A | * | 6/1999 | Jonas et al. ................... 200/1 R |
| 6,304,006 | B1 | * | 10/2001 | Jungreis ...................... 307/64 |

* cited by examiner

Primary Examiner—Bao Q. Vu
(74) Attorney, Agent, or Firm—Wells St. John P.S.

(57) ABSTRACT

An integrated transient voltage surge suppression system and automatic power transfer switch which includes a framework, an automatic transfer switch mounted to the framework, the automatic transfer switch being configured for electrical connection to a primary source of electrical power, a secondary source of electrical power, and a recipient electrical power load, the automatic transfer switch being configured to normally route primary electrical power from the primary source of electrical power to the recipient electrical power load, the automatic transfer switch being further configured to switch upon the occurrence of a predetermined switch condition such that the automatic power switch alternately routes secondary electrical power from the secondary source of electrical power to the recipient power load; and a transient voltage surge suppression device mounted to the framework and electrically positioned between the automatic transfer switch and the recipient electrical power load.

28 Claims, 4 Drawing Sheets

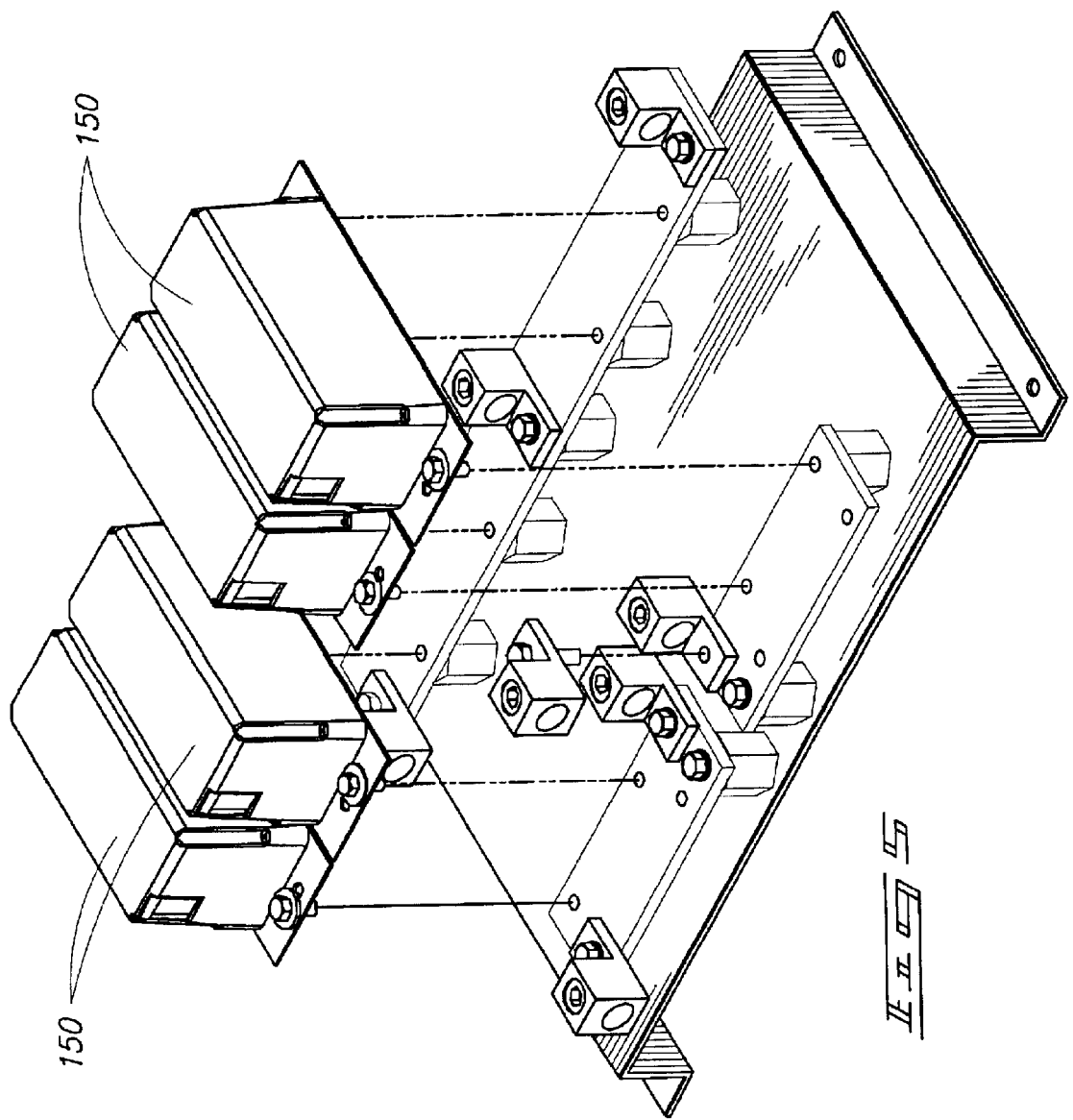

INTEGRATED HIGH VOLTAGE TRANSIENT SURGE SUPPRESSION WITH AUTOMATIC TRANSFER SWITCH FOR ALTERNATE SOURCE OF ELECTRICITY

CROSS REFERENCE TO RELATED APPLICATION

There are no related applications.

TECHNICAL FIELD

This invention generally pertains to an integrated high voltage transient surge suppression with an automatic transfer switch for switching to an alternative source of electricity such as a generator.

BACKGROUND OF THE INVENTION

The use of electronic, electrical and communications equipment of all types continues to accelerate. The electronic circuitry, analog circuits, solid state and other component devices which are more predominantly used today are much more vulnerable and sensitive to damage from inconsistent or unpredictable variations in the power supply voltage. The need for transient voltage surge suppression has therefore likewise been increasing.

The increased need for alternative sources of electricity is growing and it is preferable to switch to the alternative source of electrical power automatically in the event the primary source of electrical power is interrupted. The primary source of electrical power will typically be an electrical utility.

It is an object of this invention to provide an integrated transient voltage surge suppression system and automatic transfer switch to provide the combined features of surge suppression and automatic transfer between two sources of electrical power.

BRIEF DESCRIPTION OF THE DRAWINGS

Preferred embodiments of the invention are described below with reference to the following accompanying drawings:

FIG. 5 is a perspective exploded view of transient voltage surge suppression system components which may be utilized in embodiments of this invention;

DETAILED DESCRIPTION OF THE PREFERRED EMBODIMENTS

Figure 1:
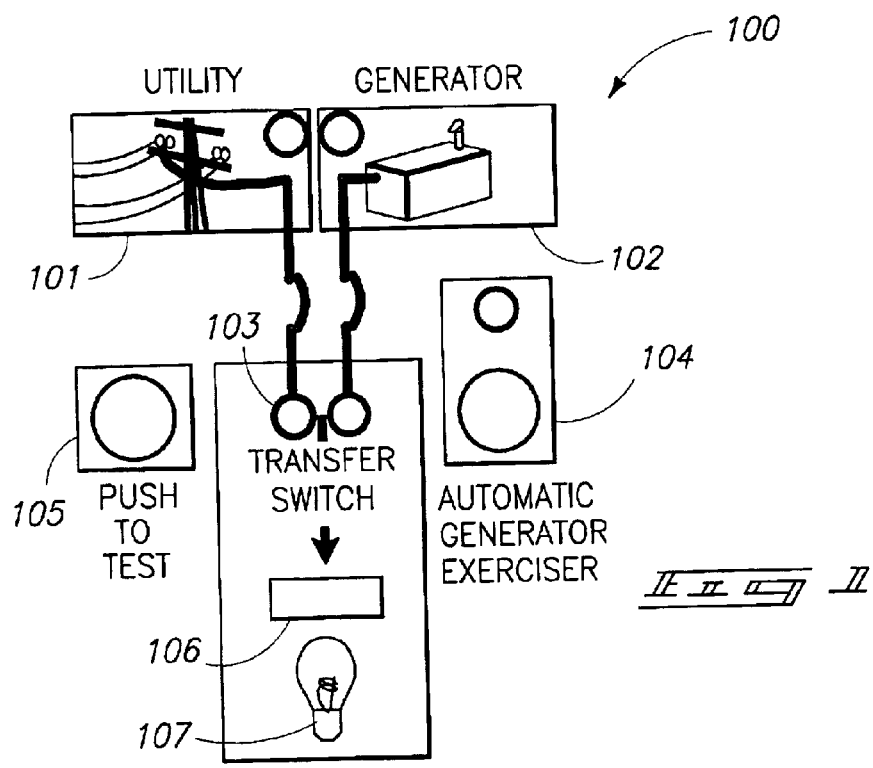
FIG. 1 is a schematic depiction of an embodiment of a system contemplated by this invention.

Many of the fastening, connection, manufacturing and other means and components utilized in this invention are widely known and used in the field of the invention described, and their exact nature or type is not necessary for an understanding and use of the invention by a person skilled in the art or science; therefore, they will not be discussed in significant detail. Furthermore, the various components shown or described herein for any specific application of this invention can be varied or altered as anticipated by this invention and the practice of a specific application or embodiment of any element may already be widely known or used in the art or by persons skilled in the art or science; therefore, each will not be discussed in significant detail.

The terms "a", "an", and "the" as used in the claims herein are used in conformance with long-standing claim drafting practice and not in a limiting way. Unless specifically set forth herein, the terms "a", "an", and "the" are not limited to one of such elements, but instead mean "at least one".

The term "integrated" as used herein is used in a broader sense than its dictionary definition and is used in reference to an integrated power distribution and transient voltage surge suppression device to indicate that the traditional or typical automatic transfer switching functions and the transient voltage surge suppression functions have been integrated into the same distribution panel.

The integration of the two, among other benefits and advantages, allows the panel and the connections between the transient voltage surge suppression elements and the automatic transfer switching between alternative sources of electricity, at the factory and not at the field where higher incidence of errors may occur. There are other benefits as well.

The term "mount" or "mounted" as used herein is used in a broader sense in that it means a direct or indirect mounting, placing on, attaching to, fastening of one element to another or disposing one closely to another.

The term "contact" as used herein is a point where a conductor of one device, component or element can be conductively or electrically connected to another. Contact as used herein can be either direct or indirect.

The term "connected" as used herein may be used with respect to a direct or indirect physical connection between two parts or in terms of a direct or indirect electrical connection between two electrical elements.

The term "predetermined switch condition" as used herein means any one or more of a number of different conditions or parameters which are chosen to cause the automatic transfer switch to switch to alternately route secondary electrical power from the secondary source of electrical power to the recipient power load.

The term "electrically positioned between" as used herein means the device or component is located electrically between the two other stated components. For instance if a transient voltage surge suppression device is electrically positioned between an automatic transfer switch and a recipient power load, the transient voltage surge suppression device is positioned to react to and suppress electrical power between the two. The normal flow of electrical power may but need not flow through it, so long as the transient voltage surge suppression device is positioned to suppress the electrical power flowing between the two component between which it is said to be positioned, which is known by those of ordinary skill in the art.

FIG. 1 is a schematic or box type depiction of the general or overall configuration of system 100 contemplated by this invention, including a primary source 101 of electrical power, which may be from an electrical utility, and an alternate or secondary source 102 of electrical power, preferably from a generator. FIG. 1 further illustrates automatic transfer switch 103 combined and integrated with transient voltage surge suppression system 106 and power or load panel represented by load 107. FIG. 1 also illustrates a test function for testing the automatic transfer switch 105 and an automatic generator exerciser 104.

It will be appreciated by those of ordinary skill in the art that this invention may be utilized for any two or more alternative sources of electrical power, such as an electrical utility, a generator, fuel cells, and others.

Although the term primary source and secondary source relative to the sources of electrical power, these terms are referring to a first and a second source and intended to also cover two or more sources of electrical power even if they are relatively equal so long as there is switching from one of the sources to one or more other sources.

Figure 2:
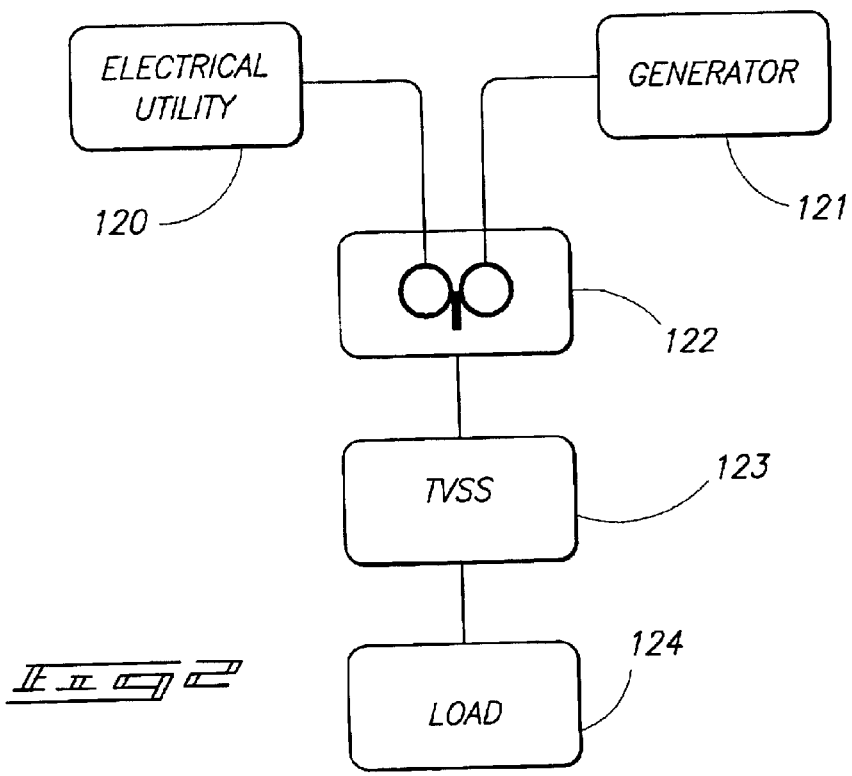
FIG. 2 is an electrical block diagram of an embodiment contemplated by this invention.

FIG. 2 is a box diagram showing an embodiment of a general system configuration contemplated by this invention, including primary source of electrical power 120, a secondary source of electrical power 121, an automatic transfer switch 122, a transient voltage surge suppression unit 123 and a box representing a recipient electrical power load 124. Electrical power would generally go through a power distribution panel between the transient voltage surge suppression unit 123 and the recipient electrical power load 124.

There are a number of different automatic transfer switches which may be utilized in embodiments of this invention, one example being ASCO 165 Series Automatic Transfer Switch, Model #165A2200F3x. Automatic transfer switches of this kind may have their own controllers, and for example could be configured to be preset so that if the voltage drops from two hundred forty (240) Vac to one hundred eighty (180) Vac, or if the frequency drops from sixty (60) Hz to fifty-four (54) Hz, then the generator may be started, will warm up for a predetermined amount of time, and then the load will transfer over to the secondary source, a generator in this example. If the primary source, likely an electrical utility, then picks back up or meets the pickup requirements of the controls (such as if the voltage rises back up to two hundred four Vac or more and the frequency is at or over fifty-seven (57) Hz), then the automatic transfer switch re-routes or re-transfers the load back to the primary source of electrical power and the generator will be shut down after a cool-down period). This may also be referred to as a predetermined switch-back condition, i.e. the voltage, frequency or other condition coming back within a range of acceptable parameters.

Although not necessary to practice the invention, it is preferred that the automatic transfer be controlled within the automatic transfer switch itself, including the logic to sense the variances. The controller is connected to the switching mechanism via a wire harness and may be mounted inside the same enclosure near the switching mechanism.

Figure 3:
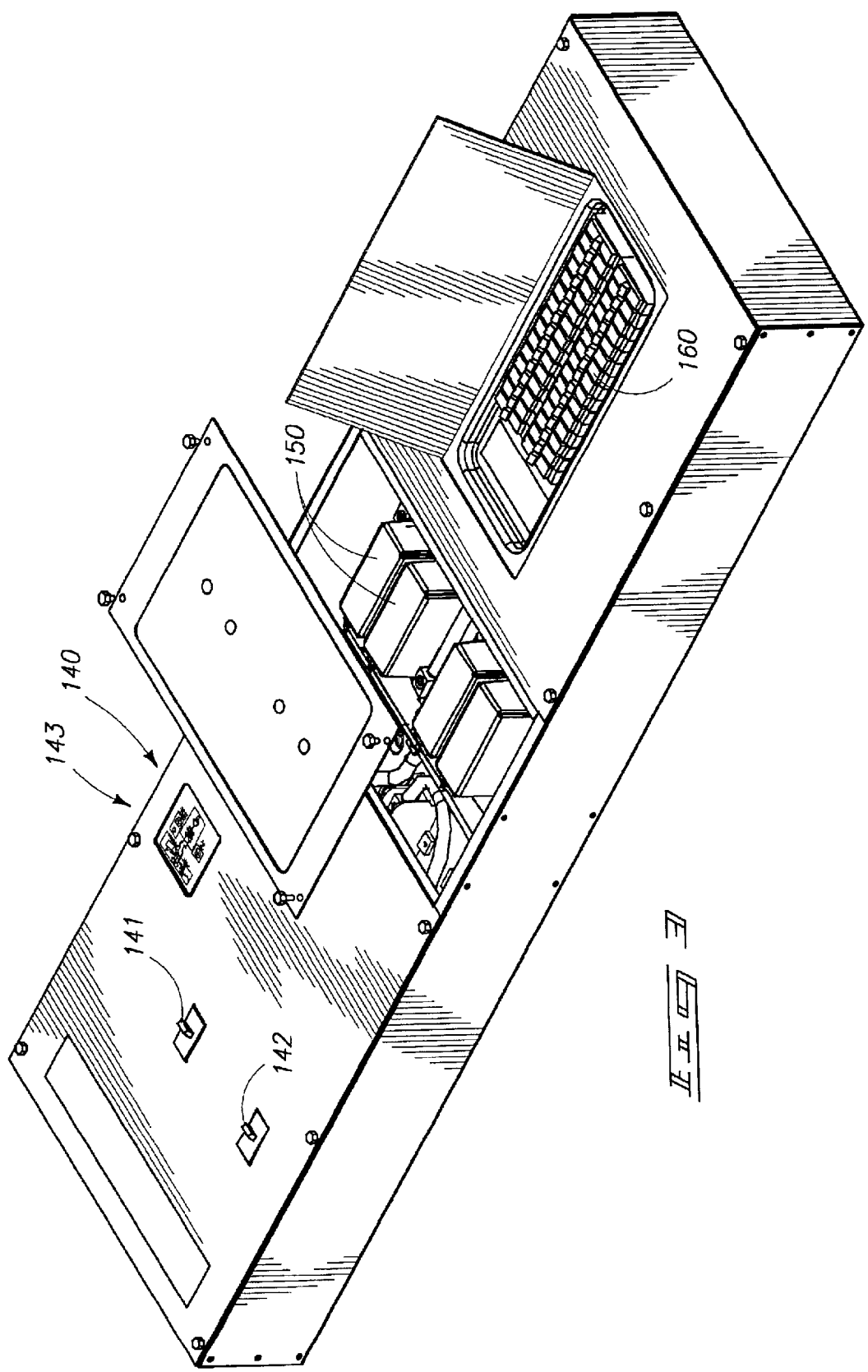
FIG. 3 is a perspective view of an embodiment of a cabinet which may be utilized within the contemplation of this invention.

FIG. 3 is a perspective view of an integrated cabinet or distribution panel 140, illustrating secondary source of electrical power (a generator in this embodiment) disconnect (a breaker in this embodiment) 141, utility or primary source of electrical power 142 and the automatic transfer switch (ATS) control panel 143. FIG. 3 further illustrates transient voltage surge suppression modules 150, and load center 160. The integration within one structure, distribution panel or framework, or fixed together, provides multiple advantages to the user, such as the integration of the devices prior to installation.

Figure 4:
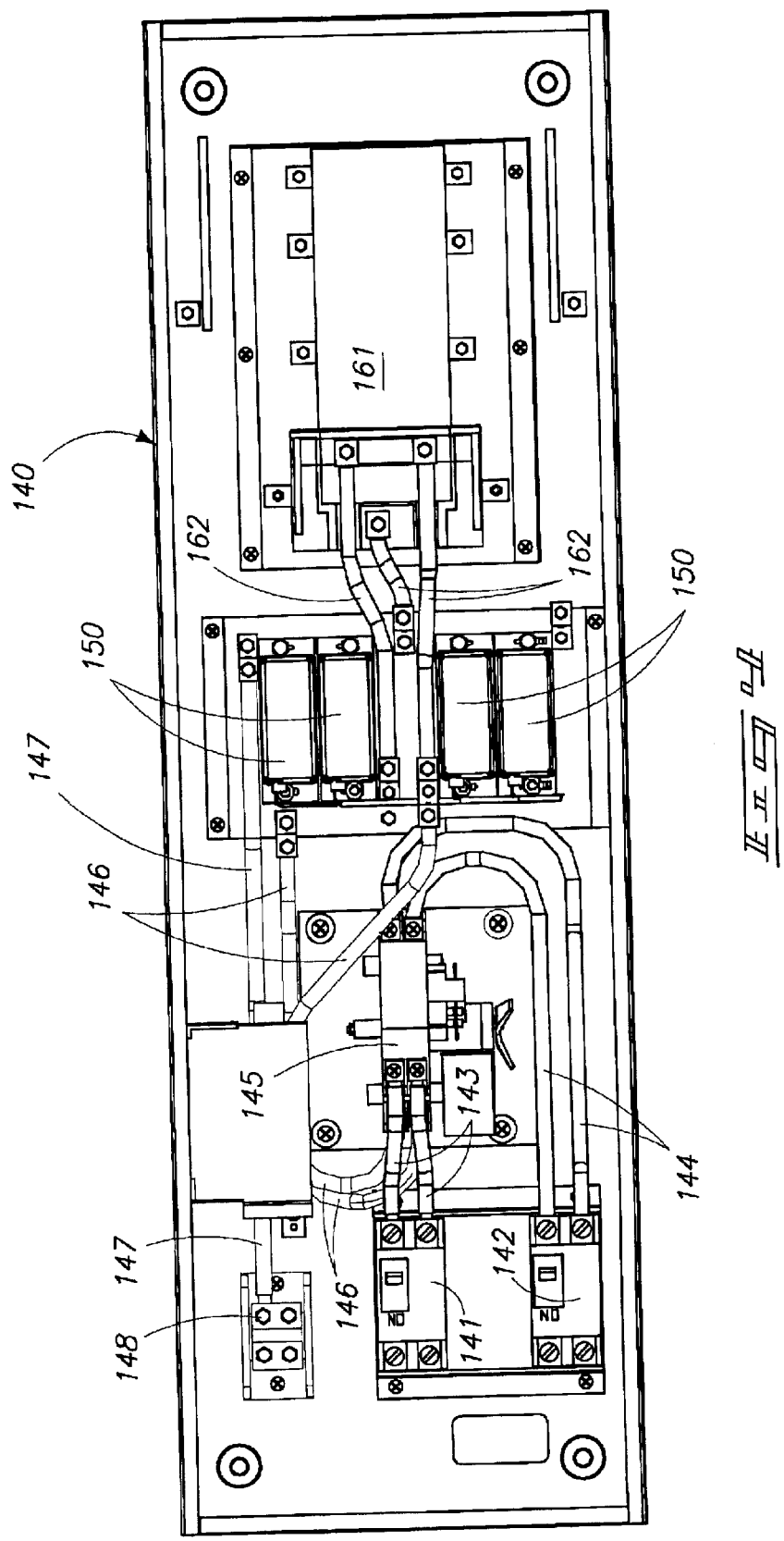
FIG. 4 is a top view of the cabinet illustrated in FIG. 3, showing one embodiment of a configuration of an integrated automatic transfer switch and transient surge suppression system contemplated by this invention.

FIG. 4 is a top view of the inside of distribution panel or cabinet 140 with the top cover removed for easier viewing of the components of this embodiment of the invention. It will be appreciated by those of ordinary skill in the art that no particular transient voltage surge suppression system need be utilized as part of this invention, but instead any one of a number of surge suppression systems may be used in this combination.

FIG. 4 illustrates distribution panel 140 (which is one of a number of examples of possible frameworks which may be utilized in this invention), primary breaker 142 through which the primary source of electrical power may be routed into the panel framework, secondary breaker 141, through which the secondary source of electrical power may be routed into the panel framework.

The primary source of electrical power is preferably a source of electricity or electrical power from an electric utility company source. The secondary or alternate source of electrical power is preferably from a generator.

Primary electrical power is routed through breaker 142, through primary conductors 144 to automatic transfer switch 145. Secondary electrical power is routed through breaker 141, through secondary conductors 143 to automatic transfer switch 145. The automatic transfer switch 145 controls which source of electrical power is applied to the load. Transfer conductors 146 are utilized to route electrical power from the automatic transfer switch 145 to the transient voltage surge suppression device 150. Neutral terminal block 148 and neutral conductor 147 provide neutral connections for the system.

Position load center 161, or panel, receives electrical power from the transient voltage surge suppression device 150 through load center conductors 162, and may provide several points of distribution of the electrical power to the various loads being serviced there-through. FIG. 4 provides an illustration of one embodiment of how the transient voltage surge suppression modules may be electrically positioned between the automatic transfer switch and the recipient power load.

It will also be appreciated by those of ordinary skill in the art that the automatic transfer switch, once switched to route secondary power to the recipient power load, may automatically re-transfer back, switch back or re-route the load back to the primary source of electrical power, based on any one of a number of predetermined conditions. Examples of some of the predetermined conditions may be conditions such as the cessation of the original predetermined condition, a lapse of time or on the occurrence of a switch-back predetermined condition, the reaching of a retransfer parameter such as the voltage or the frequency level of the electrical power from the primary source thereof. The ASCO 165 Series Automatic Transfer Switch, Model #165A2200F3x provides these control features in the controller which is provided with the automatic transfer switch.

FIG. 5 is an exploded perspective view of one example of a transient voltage surges suppression device which may be utilized in this invention, although the invention is certainly not limited to any one type. FIG. 5 illustrates transient voltage surge suppression devices 150 or modules mounted on and across bus bars 151 and 152, to provide the surge suppression. The bus bars would preferably be a neutral conductor and a phase conductor. Standard lugs such as lug 153 may be utilized for making connections.

As will be appreciated by those of reasonable skill in the art, there are numerous embodiments to this invention, and variations of elements and components which may be used, all within the scope of this invention.

One embodiment of this invention, for example, is a An integrated transient voltage surge suppression system and automatic power transfer switch, comprising a framework, an automatic transfer switch mounted to the framework, the automatic transfer switch being configured for electrical connection to a primary source of electrical power, a secondary source of electrical power, and a recipient electrical power load; the automatic transfer switch being configured to normally route primary electrical power from the primary source of electrical power to the recipient electrical power load; the automatic transfer switch being further configured to switch upon the occurrence of a predetermined switch condition such that the automatic power switch alternately routes secondary electrical power from the secondary source of electrical power to the recipient power load; and a transient voltage surge suppression device mounted to the framework and electrically positioned between the automatic transfer switch and the recipient electrical power load.

Further embodiments of what is described in the preceding paragraph may be: further comprising a power load distribution center mounted to the framework and electrically positioned between the transient voltage surge suppression device and the recipient electrical power load; wherein the primary source of electrical power is from power distribution lines; wherein the secondary source of electrical power is from an electrical generator; wherein the automatic transfer switch is electrically connected to the primary source of electrical power via a primary phase conductor and a primary neutral conductor; wherein the automatic transfer switch is electrically connected to the secondary source of electrical power via a secondary phase conductor and a secondary neutral conductor; wherein the automatic transfer switch is configured to automatically switch back to again route electrical power from the primary source of electrical power to the recipient electrical power load upon the occurrence of a switch-back predetermined condition; wherein the switch-back predetermined condition is a cessation of the original predetermined condition; and/or wherein the switch-back predetermined condition is a lapse of time.

In another embodiment of the invention, an integrated transient voltage surge suppression system and automatic power transfer switching means, comprising: a housing means; an automatic transfer switching means mounted to the housing means, the automatic transfer switching means being configured for electrical connection to a primary source of electrical power, a secondary source of electrical power, and a recipient electrical power load; the automatic transfer switching means being configured to normally route primary electrical power from the primary source of electrical power to the recipient electrical power load; the automatic transfer switching means being further configured to switch upon the occurrence of a predetermined switch condition such that the automatic power switch alternately routes secondary electrical power from the secondary source of electrical power to the recipient power load; and a transient voltage surge suppression means mounted to the framework and electrically positioned between the automatic transfer switching means and the recipient electrical power load.

Further embodiments of what is described in the preceding paragraph may be: further comprising a power load distribution center mounted to the framework and electrically positioned between the transient voltage surge suppression device and the recipient electrical power load; wherein the primary source of electrical power is from power distribution lines; wherein the secondary source of electrical power is from an electrical generator; wherein the automatic transfer switch is electrically connected to the primary source of electrical power via a primary phase conductor and a primary neutral conductor; wherein the automatic transfer switch is electrically connected to the secondary source of electrical power via a secondary phase conductor and a secondary neutral conductor; wherein the automatic transfer switch is configured to automatically switch back to again route electrical power from the primary source of electrical power to the recipient electrical power load upon the occurrence of a switch-back predetermined condition; wherein the switch-back predetermined condition is a cessation of the original predetermined condition; and/or wherein the switch-back predetermined condition is a lapse of time.

In another embodiment, an integrated transient voltage surge suppression system, automatic power transfer switch and power distribution panel is disclosed, which comprises a power distribution panel framework; an automatic transfer switch mounted in the power distribution panel framework, the automatic transfer switch being configured for electrical connection to a primary source of electrical power, a secondary source of electrical power, and a recipient electrical power load; the automatic transfer switch being configured to normally route primary electrical power from the primary source of electrical power to the recipient electrical power load; the automatic transfer switch being further configured to switch upon the occurrence of a predetermined switch condition such that the automatic power switch alternately routes secondary electrical power from the secondary source of electrical power to the recipient power load; a transient voltage surge suppression device mounted in the power distribution panel framework and electrically positioned between the automatic transfer switch and the recipient electrical power load; and a position load center mounted in the power distribution panel framework and electrically positioned between the transient voltage surge suppression device and the recipient electrical power load.

Additional and/or further embodiments of the above may be further wherein: the primary source of electrical power is from power distribution lines; the secondary source of electrical power is from an electrical generator; the automatic transfer switch is configured to automatically switch back to again route electrical power from the primary source of electrical power to the recipient electrical power load upon the occurrence of a switch-back predetermined condition; the switch-back predetermined condition is a cessation of the original predetermined condition; the switch-back predetermined condition is a lapse of time; the automatic transfer switch is configured to switch back the recipient electrical power load to the primary source of electrical power upon the occurrence of a predetermined switch-back condition.

In yet another embodiment, an integrated automatic power transfer switch and power distribution panel is provided, comprising: a power distribution panel framework; an automatic transfer switch mounted in the power distribution panel framework, the automatic transfer switch being configured for electrical connection to a primary source of electrical power, a secondary source of electrical power, and a recipient electrical power load; the automatic transfer switch being configured to normally route primary electrical power from the primary source of electrical power to the recipient electrical power load; the automatic transfer switch being further configured to switch upon the occurrence of a predetermined switch condition such that the automatic power switch alternately routes secondary electrical power from the secondary source of electrical power to the recipient power load; and a position load center mounted in the power distribution panel framework and electrically positioned between the automatic transfer switch and the recipient electrical power load.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. An integrated transient voltage surge suppression system and automatic power transfer switch, comprising:
   a framework;
   an automatic transfer switch mounted to the framework, the automatic transfer switch being configured for electrical connection to a primary source of electrical power, a secondary source of electrical power, and a recipient electrical power load;
   the automatic transfer switch being configured to normally route primary electrical power from the primary source of electrical power to the recipient electrical power load;
   the automatic transfer switch being further configured to switch upon the occurrence of a predetermined switch condition such that the automatic power switch alternately routes secondary electrical power from the secondary source of electrical power to the recipient power load; and
   a transient voltage surge suppression device mounted to the framework and electrically positioned between the automatic transfer switch and the recipient electrical power load.

2. An integrated transient voltage surge suppression system and automatic power transfer switch as recited in claim 1, and further comprising a power load distribution center mounted to the framework and electrically positioned between the transient voltage surge suppression device and the recipient electrical power load.

3. An integrated transient voltage surge suppression system and automatic power transfer switch as recited in claim 1, and further wherein the primary source of electrical power is from power distribution lines.

4. An integrated transient voltage surge suppression system and automatic power transfer switch as recited in claim 1, and further wherein the secondary source of electrical power is from an electrical generator.

5. An integrated transient voltage surge suppression system and automatic power transfer switch as recited in claim 1, and further wherein the automatic transfer switch is electrically connected to the primary source of electrical power via a primary phase conductor and a primary neutral conductor.

6. An integrated transient voltage surge suppression system and automatic power transfer switch as recited in claim 1, and further wherein the automatic transfer switch is electrically connected to the secondary source of electrical power via a secondary phase conductor and a secondary neutral conductor.

7. An integrated transient voltage surge suppression system and automatic power transfer switch as recited in claim 1, and further wherein the automatic transfer switch is configured to automatically switch back to again route electrical power from the primary source of electrical power to the recipient electrical power load upon the occurrence of a switch-back predetermined condition.

8. An integrated transient voltage surge suppression system and automatic power transfer switch as recited in claim 7, and further wherein the switch-back predetermined condition is the electrical power voltage rising above a predetermined voltage.

9. An integrated transient voltage surge suppression system and automatic power transfer switch as recited in claim 7, and further wherein the switch-back predetermined condition is the electrical power frequency rising above a predetermined frequency.

10. An integrated transient voltage surge suppression system and automatic power transfer switch as recited in claim 1, and further wherein the automatic transfer switch is configured to switch back the recipient electrical power load to the primary source of electrical power upon the occurrence of a predetermined switch-back condition.

11. An integrated transient voltage surge suppression system and automatic power transfer switching means, comprising:
    a housing means;
    an automatic transfer switching means mounted to the housing means, the automatic transfer switching means being configured for electrical connection to a primary source of electrical power, a secondary source of electrical power, and a recipient electrical power load;
    the automatic transfer switching means being configured to normally route primary electrical power from the primary source of electrical power to the recipient electrical power load;
    the automatic transfer switching means being further configured to switch upon the occurrence of a predetermined switch condition such that the automatic power switch alternately routes secondary electrical power from the secondary source of electrical power to the recipient power load; and
    a transient voltage surge suppression means mounted to the framework and electrically positioned between the automatic transfer switching means and the recipient electrical power load.

12. An integrated transient voltage surge suppression system and automatic power transfer switching means as recited in claim 11, and further comprising a power load distribution center mounted to the framework and electrically positioned between the transient voltage surge suppression device and the recipient electrical power load.

13. An integrated transient voltage surge suppression system and automatic power transfer switching means as recited in claim 11, and further wherein the primary source of electrical power is from power distribution lines.

14. An integrated transient voltage surge suppression system and automatic power transfer switching means as recited in claim 11, and further wherein the secondary source of electrical power is from an electrical generator.

15. An integrated transient voltage surge suppression system and automatic power transfer switching means as recited in claim 11, and further wherein the automatic transfer switch is electrically connected to the primary source of electrical power via a primary phase conductor and a primary neutral conductor.

16. An integrated transient voltage surge suppression system and automatic power transfer switching means as recited in claim 11, and further wherein the automatic transfer switch is electrically connected to the secondary source of electrical power via a secondary phase conductor and a secondary neutral conductor.

17. An integrated transient voltage surge suppression system and automatic power transfer switching means as recited in claim 11, and further wherein the automatic transfer switch is configured to automatically switch back to again route electrical power from the primary source of electrical power to the recipient electrical power load upon the occurrence of a switch-back predetermined condition.

18. An integrated transient voltage surge suppression system and automatic power transfer switching means as recited in claim 17, and further wherein the switch-back predetermined condition is the electrical power voltage rising above a predetermined voltage.

19. An integrated transient voltage surge suppression system and automatic power transfer switching means as recited in claim 17, and further wherein the switch-back predetermined condition is the electrical power frequency rising above a predetermined frequency.

20. An integrated transient voltage surge suppression system and automatic power transfer switching means as recited in claim 11, and further wherein the automatic transfer switch is configured to switch back the recipient electrical power load to the primary source of electrical power upon the occurrence of a predetermined switch-back condition.

21. An integrated transient voltage surge suppression system, automatic power transfer switch and power distribution panel, comprising:

a power distribution panel framework;

an automatic transfer switch mounted in the power distribution panel framework, the automatic transfer switch being configured for electrical connection to a primary source of electrical power, a secondary source of electrical power, and a recipient electrical power load;

the automatic transfer switch being configured to normally route primary electrical power from the primary source of electrical power to the recipient electrical power load;

the automatic transfer switch being further configured to switch upon the occurrence of a predetermined switch condition such that the automatic power switch alternately routes secondary electrical power from the secondary source of electrical power to the recipient power load;

a transient voltage surge suppression device mounted in the power distribution panel framework and electrically positioned between the automatic transfer switch and the recipient electrical power load; and a position load center mounted in the power distribution panel framework and electrically positioned between the transient voltage surge suppression device and the recipient electrical power load.

22. An integrated transient voltage surge suppression system, automatic power transfer switch and power distribution panel as recited in claim 21, and further wherein the primary source of electrical power is from power distribution lines.

23. An integrated transient voltage surge suppression system, automatic power transfer switch and power distribution panel as recited in claim 21, and further wherein the secondary source of electrical power is from an electrical generator.

24. An integrated transient voltage surge suppression system, automatic power transfer switch and power distribution panel as recited in claim 21, and further wherein the automatic transfer switch is configured to automatically switch back to again route electrical power from the primary source of electrical power to the recipient electrical power load upon the occurrence of a switch-back predetermined condition.

25. An integrated transient voltage surge suppression system, automatic power transfer switch and power distribution panel as recited in claim 21, and further wherein the switch-back predetermined condition is the electrical power voltage rising above a predetermined voltage.

26. An integrated transient voltage surge suppression system, automatic power transfer switch and power distribution panel as recited in claim 21, and further wherein the switch-back predetermined condition is the electrical power frequency rising above a predetermined frequency.

27. An integrated transient voltage surge suppression system, automatic power transfer switch and power distribution panel as recited in claim 21, and further wherein the automatic transfer switch is configured to switch back the recipient electrical power load to the primary source of electrical power upon the occurrence of a predetermined switch-back condition.

28. An integrated automatic power transfer switch and power distribution panel, comprising:

a power distribution panel framework;

an automatic transfer switch mounted in the power distribution panel framework, the automatic transfer switch being configured for electrical connection to a primary source of electrical power, a secondary source of electrical power, and a recipient electrical power load;

the automatic transfer switch being configured to normally route primary electrical power from the primary source of electrical power to the recipient electrical power load;

the automatic transfer switch being further configured to switch upon the occurrence of a predetermined switch condition such that the automatic power switch alternately routes secondary electrical power from the secondary source of electrical power to the recipient power load; and a position load center mounted in the power distribution panel framework and electrically positioned between the automatic transfer switch and the recipient electrical power load.

\* \* \* \* \*